No. 638,332. Patented Dec. 5, 1899.
A. B. HENDRICKS.
FRUIT PICKER'S BASKET.
(Application filed Jan. 24, 1899.)

(No Model.)

WITNESSES
M. G. MacLean
J. J. Bowen

INVENTOR
Allan Barringer Hendricks,
BY
Barr Deemer
ATTORNEYS

THE NORRIS PETERS CO., PHOTO-LITHO., WASHINGTON, D. C.

UNITED STATES PATENT OFFICE.

ALLAN BARRINGER HENDRICKS, OF RED HOOK, NEW YORK.

FRUIT-PICKER'S BASKET.

SPECIFICATION forming part of Letters Patent No. 638,332, dated December 5, 1899.

Application filed January 24, 1899. Serial No. 703,289. (No model.)

*To all whom it may concern:*

Be it known that I, ALLAN BARRINGER HENDRICKS, a citizen of the United States, and a resident of Red Hook, county of Dutchess, and State of New York, have invented certain new and useful Improvements in Fruit-Pickers' Baskets, of which the following is a specification, reference being had to the accompanying drawings, forming a part thereof, in which similar letters of reference indicate corresponding parts.

This invention relates to an improved receptacle for containing fresh-picked fruit, and is adapted for the use of fruit-pickers, the object thereof being to prevent bruising of perishable fruit during the process of picking.

The device is simple in construction, durable, and inexpensive, and it is especially applicable for gathering peaches, plums, and other fruit which is susceptible to injury by excessive handling.

The invention will be hereinafter fully described, and specifically set forth in the annexed claims.

Figure 1:
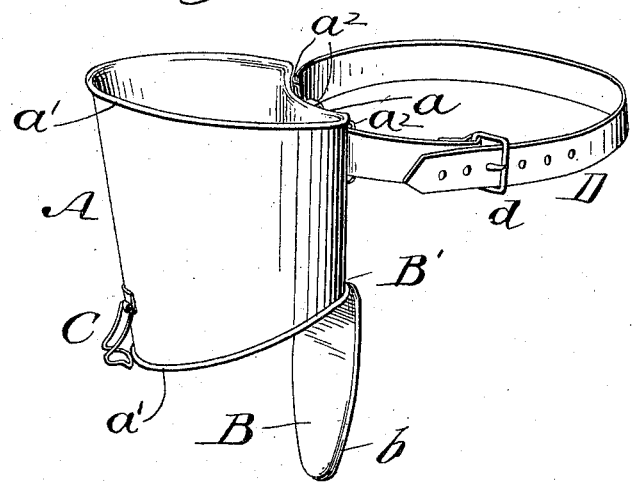
Figure 2:
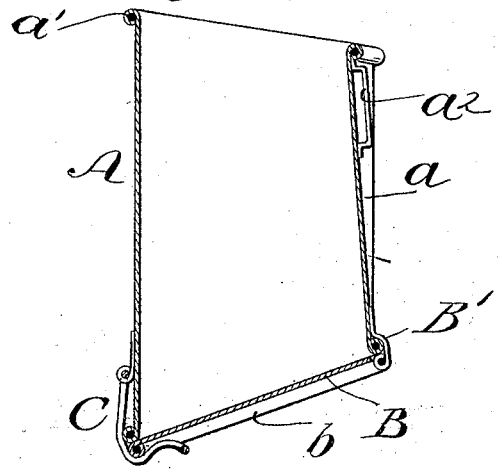

In the accompanying drawings, forming part of this specification, Figure 1 is a perspective view of my improved fruit-gatherer, and Fig. 2 is a vertical sectional elevation thereof.

In the practice of my invention I employ, primarily, a tubular receptacle A, which is provided with a concave surface $a$ upon one side thereof to fit around the body of a person while gathering fruit. This receptacle may be of any adapted form; but it is preferably approximately crescent-shaped in plan. The bottom of the tubular receptacle is normally closed by means of a swinging plate B, which is secured to the lower edge of the receptacle A by means of a hinge B', and it is maintained in closed position by a swinging clip C, secured to the wall of the receptacle opposite to the hinge of the said plate.

The material employed in constructing this device is preferably sheet metal, and top and bottom beads $a'$ are formed around the receptacle for the purpose of strengthening the device. The plate or bottom B is also provided with a bead $b$, which surrounds the same. The bottom edge of the basket is extended at an angle downwardly from the body of the fruit-picker, so that when the bottom plate B is opened the tendency will be to carry the fruit away from the person wearing the picker, and the top edge of the basket is extended at an angle upwardly from the body to prevent spilling of the fruit when the receptacle is full. The concaved surface of the receptacle near the top thereof is provided with a series of loops $a^2$, which engage a strap or girdle D, adapted for attachment to the waist of the fruit-gatherer, and this said girdle is provided with any suitable buckle or fastening device $d$.

In the operation and use of the device the person gathering the fruit adjusts the belt around his waist, allowing the receptacle to depend therefrom at any conveniently-located spot. He can then ascend a ladder, pick the fruit, and place it within the receptacle until the same is full, after which the fruit can be transferred to a basket or crate by simply opening the door or bottom B, and it is obvious that by the use of this device the fruit can be picked and shipped without the necessity of excessive handling, thus reducing the danger of injury to the fruit by bruising to a minimum.

Having thus described my invention, what I claim as new, and desire to secure by Letters Patent, is—

1. A receptacle for gathering fruit, comprising a tubular body having its bottom edge extending downwardly from the rear, a bottom hinged to said body at its rear lower edge and closing said downwardly-extending bottom-opening, said bottom being thus adapted to swing downwardly and rearwardly, means at the front edge of the body for locking the bottom to the said body, and means for attaching the device to the body of a person, substantially as shown and described.

2. A receptacle for gathering fruit, comprising a tubular receptacle provided in its rear side with a concavity to fit the body of a person, and having its bottom edge extending downwardly from the rear, a bottom hinged to said body at its rear lower edge and normally inclined downwardly and outwardly, its lower front edge being normally fastened to the front lower edge of the body, and means projecting rearwardly from the body at its top portion for attaching the device to the body of a person, substantially as shown and described.

3. As a fruit-picker's basket, the combination of a receptacle comprising a tube having a normally-closed hinged bottom thereon, and a concavity extended vertically in line with the hinge of the said bottom, said bottom being inclined downwardly from its hinged rear end, and a belt or girdle secured within the upper portion of the said concavity and projecting rearwardly and horizontally therefrom, said belt being adapted for attachment directly around the waist of a person, substantially as shown and described.

In testimony that I claim the foregoing as my invention I have signed my name, in presence of two witnesses, this 21st day of January, 1899.

ALLAN BARRINGER HENDRICKS.

Witnesses:
CLARENCE SHOOK,
B. B. HOFFMAN.